(12) United States Patent
De Kreij et al.

(10) Patent No.: US 11,285,416 B2
(45) Date of Patent: Mar. 29, 2022

(54) WET STACK GUIDE VANE HAVING A CONDENSATE COLLECTOR

(71) Applicant: HADEK PROTECTIVE SYSTEMS B.V., Rotterdam (NL)

(72) Inventors: Albert De Kreij, Rotterdam (NL); Bastiaan Van Der Woude, Rotterdam (NL)

(73) Assignee: HADEK PROTECTIVE SYSTEMS B.V., Rotterdam (NL)

( * ) Notice: Subject to any disclaimer, the term of this patent is extended or adjusted under 35 U.S.C. 154(b) by 0 days.

(21) Appl. No.: 16/766,375

(22) PCT Filed: Jan. 10, 2018

(86) PCT No.: PCT/NL2018/050015
§ 371 (c)(1),
(2) Date: May 22, 2020

(87) PCT Pub. No.: WO2019/103600
PCT Pub. Date: May 31, 2019

(65) Prior Publication Data
US 2020/0346150 A1   Nov. 5, 2020

(30) Foreign Application Priority Data

Nov. 27, 2017   (NL) ..................................... 2019982

(51) Int. Cl.
*B01D 45/00* (2006.01)
*B01D 45/06* (2006.01)
*B01D 45/16* (2006.01)

(52) U.S. Cl.
CPC ............. *B01D 45/06* (2013.01); *B01D 45/16* (2013.01); *B01D 2258/0283* (2013.01)

(58) Field of Classification Search
CPC .............................. B01D 45/06; B01D 45/16; B01D 2258/0283; B01D 45/08; B01D 45/12;
(Continued)

(56) References Cited

U.S. PATENT DOCUMENTS 1,519,428 A  *  12/1924  Wilisch .................. B01D 45/08
                                                              96/299
3,254,475 A  *   6/1966  Farr ....................... B01D 45/16
                                                              96/232

(Continued)

FOREIGN PATENT DOCUMENTS

CN      202343017 U     7/2012
CN      102741520 A    10/2012
(Continued)

OTHER PUBLICATIONS

International Search Report and Written Opinion dated Jul. 24, 2018, corresponding to Application No. PCT/NL2018/050015.
(Continued)

*Primary Examiner* — Dung H Bui
(74) *Attorney, Agent, or Firm* — Patterson & Sheridan, L.L.P.

(57) ABSTRACT

A guide vane for deflecting flue gas in a wet stack comprises a front guiding face and an opposite back face and a condensate collector for removing liquid droplets from the flue gas. The condensate collector comprises an enclosure having an inlet for entering flue gas in the front guiding face of the guiding vane, and an outlet for leaving flue gas. The enclosure defines a flow path for flue gas from the inlet to the exit, where liquid droplets will be removed from the flue gas. The condensate collector also is provided with a gutter for collecting liquid droplets separated from the flue gas.

19 Claims, 4 Drawing Sheets

(58) Field of Classification Search
CPC .............. B01D 50/002; B01D 53/1475; B01D 53/1493; B01D 45/18; B01D 2221/16; B01D 1/305; B01D 19/0042; B01D 3/008; B01D 3/10; B01D 3/26; Y02C 10/06; F23J 13/00; F23J 11/00; Y10T 29/49718; E04H 12/28; F23L 17/14
See application file for complete search history.

(56) References Cited

U.S. PATENT DOCUMENTS

| | | | | |
|---|---|---|---|---|
| 3,673,771 | A * | 7/1972 | Dickey | F02C 7/052 55/306 |
| 3,970,439 | A * | 7/1976 | Murphy | B01D 45/04 55/306 |
| 4,057,482 | A * | 11/1977 | Candor | B01D 21/0009 204/672 |
| 4,581,048 | A * | 4/1986 | Svoboda | F22B 37/28 55/307 |
| 4,704,145 | A * | 11/1987 | Norris | F02C 7/052 55/306 |
| 4,738,585 | A * | 4/1988 | von Bockh | F22B 37/28 415/115 |
| 4,938,785 | A * | 7/1990 | MacPherson, Jr. | B01D 45/16 55/439 |
| 5,104,431 | A * | 4/1992 | Fewel, Jr. | B01D 45/08 55/440 |
| 5,130,082 | A * | 7/1992 | Oosterkamp | G21C 15/16 376/371 |
| 2006/0283159 | A1 * | 12/2006 | Scherrer | B01D 45/08 55/434 |
| 2007/0266854 | A1 * | 11/2007 | Scherrer | B01D 45/06 95/267 |
| 2008/0168753 | A1 * | 7/2008 | Christiansen | B01D 45/16 55/440 |
| 2009/0235622 | A1 * | 9/2009 | Stucki | B01D 45/06 55/418 |
| 2017/0089208 | A1 * | 3/2017 | Kippel | F01D 25/04 |
| 2017/0157545 | A1 * | 6/2017 | Samela | B01D 45/08 |

FOREIGN PATENT DOCUMENTS

| | | |
|---|---|---|
| CN | 203857475 U | 10/2014 |
| CN | 106731257 A | 5/2017 |
| DE | 3010316 A1 | 9/1981 |
| GB | 1119857 A | 7/1968 |
| GB | 1430900 A | 4/1976 |
| JP | 5141199 B2 | 2/2013 |
| WO | 2006/122940 A1 | 11/2006 |

OTHER PUBLICATIONS

Netherlands Search Report and Writen Opinion dated Jul. 13, 2018, corresponding to Application No. 2019982.
Chinese Office Action dated May 28, 2021, for corresponding Chinese Patent Application No. 201880076490.X.

* cited by examiner

WET STACK GUIDE VANE HAVING A CONDENSATE COLLECTOR

The present invention relates to a guide vane for deflecting a flue gas in a wet stack having a condensate collector, as well as a wet stack provided with one or more of such guide vanes.

Nowadays new coal-fired utility power plants are typically provided with flue gas desulfurization systems and old ones are upgraded. Many of these systems employ wet technologies. It is known in the art that in such a case the humid (fully saturated) flue gas exiting the desulfurization system could be reheated to dry the flue gas before the gas is passed to the stack. However, due to increasingly high cost of energy and the requirement to reduce SO2 emissions, flue gas reheating is no longer an economical and environmentally friendly option. Instead thereof so-called wet stack operation has come into practice. That is to say, the flue gas exiting the wet desulfurization system enters the stack directly. Generally a mist eliminating device for catching liquid droplets from the flue gas is interposed between the wet desulfurization system and the stack. Water vapor condensing on the internal walls of the ducts between the desulfurization system and/or mist eliminating device and the stack and of the stack itself, together with droplets carried over from the mist eliminating device form a liquid film on these walls. This liquid film is collected and drained from the stack. If the designed configuration of ducts, stack and condensate collectors, also taking into account that droplets from the film may be re-entrained by the flow of flue gas, is not functioning properly under the actual operating conditions, unacceptable amounts of liquid droplets may be discharged from the top of the stack and deposit in the neighbourhood of the stack. This phenomenon is also known "spitting".

It is also known in the art to provide one or more guide vanes for guided deflection of the flow of flue gas, in particular at the inlet of flue gas in the chimney.

E.g. U.S. Pat. No. 6,562,108B2 discloses a stack having a liquid separator for removing a liquid entrained in a gas in the stack, which stack has a base and a top and comprises at least one duct having a longitudinal axis entering the stack adjacent said base. At least one vertical vane is disposed at and angled to the longitudinal axis of the duct. A liquid collector is arranged adjacent the top of the stack for recovering liquid.

Furthermore CN104474794B discloses a condensate liquid collection device at the top end of a wet chimney flue gas guide plate The condensate liquid collection device comprises a fixed bracket and a collecting groove, which collecting groove is mounted on the top end of the wet chimney flue gas guide plate through the fixed bracket. Both sides of the collecting groove are each provided with a notch. A lowest position in each notch is provided with a drainage hole and a drainage pipe. The interior of the collecting groove is provided with reinforcing plates and water guide plates. The water guide plates are used for guiding a collected condensate liquid to flow to the drainage pipes for being discharged out of the chimney. According to CN104474794A the condensate is effectively avoided from being re-entrained. In the embodiments disclosed the condensate film is deemed to flow along the surface of the guide plate upwardly to the top end thereof due to the flow of flue gas and overflows this top end into the collecting groove. A drawback thereof is that the risk of re-entrainment of droplets from the film into the flowing flue gas during travelling along the surface of the guiding plate and in particular at the moment of overflow is likely to occur, thereby reducing the droplet removal efficiency and the risk of spitting still exists.

From CN203857475U a guide vane device having a lower condensate collector for a wet chimney entry is known. In particular, the guide vane device comprises guide vanes and pillars. The guide vanes are arranged at the bottom of the chimney entry. One end of each pillar is fixed on an ash accumulation platform and the other end of each pillar is connected with the corresponding guide vane. The guide vanes and the horizontal section of a chimney form an included angle. The upper surfaces of the guide vanes face a flue gas inlet arranged in the bottom of the chimney, so that after entering of flue gas, condensate derived from the flue gas in the chimney is collected by the ash accumulation hopper and drained from the chimney. Again re-entrainment of droplets from the condensate film on the guide vane is likely to occur, because the liquid has to flow over the surface of the guide vane downwardly to the ash accumulation in a counter direction to the flow of flue gas.

The present invention aims at providing a guide vane having an improved condensate removal function, or a suitable alternative.

In a first aspect the present invention provides a guide vane for deflecting flue gas in a wet stack, comprising a front guiding face and an opposite back face and a condensate collector for removing liquid droplets from the flue gas, wherein the condensate collector comprises an enclosure having an inlet for entering flue gas in the front guiding face of the guiding vane, wherein the enclosure defines a flow path for flue gas from the inlet to the exit, and a gutter for collecting liquid droplets separated from the flue gas The guide vane for deflecting flue gas in a wet stack according to the invention comprises a front guiding face and an opposite back face. The front face faces the inlet of the stack, which in general terms comprises a shell delimiting an upright duct for the flow of flue gas, optionally provided with a liner such as closed cell glass blocks, e.g. from borosilicate. The chimney has one or more inlets for introducing flue gas, generally at a lower part of the chimney, and a top outlet for discharging the flue gas into the environment. The guide vane is provided with a condensate collector for removing liquid droplets, which are collected from the flue gas on the front guiding face of the guiding vane. According to the invention the condensate collector comprises an enclosure. Some of the walls delimiting the enclosure, in particular the lateral walls, may be provided by the shell delimiting the duct into which the guide vane is installed. An inlet for entering flue gas is arranged in the front guiding face of the guiding vane. Typically the inlet extends over the full width of the guiding vane up to the inner walls of the shell delimiting the duct of the stack. The condensate collector also has an outlet for exiting flue gas again into the duct, so that it is allowed to flow further in the duct to the top outlet of the stack. Generally the outlet extends also over the full width of the guiding vanes up to the inner walls of the shell. Within the enclosure a flow path for flue gas from the inlet at the front guiding face to the outlet is provided, wherein liquid droplets are separated from the flue gas flowing through the enclosure. Droplets hit the inner walls of the enclosure and are collected thereby. An example of a flow path capable of separating the droplets from the flue gas is a non-linear flow path for the flue gas, in particular a flow path having one, or two or more U turns. A gutter, typically arranged in the lowest part of the enclosure, collects liquid droplets separated from the flue gas. Generally the gutter has one or more connection parts for connecting to a drain for discharging the collected droplets as condensate from the stack.

During operation the condensate film will flow along the guiding front face to the inlet and overflows the entrance thereof entering the condensate collector, where the condensate will pass into the gutter and drain therefrom. Moreover, due to the diversion of the flow of flue gas by the guide vane into a front stream flowing along the front guiding face of the guiding vane and a back stream flowing behind the guiding vane the pressure of the front stream of the flue gas will be higher than that of the back stream. Because of this pressure difference part of the front stream is forced into the inlet of the condensate collector. Due to their weight droplets, whether still contained in the partial front stream or re-entrained thereby, cannot follow the path at the inlet and within the enclosure as traveled by the flue gas. Consequently the droplets will hit the enclosure inner walls resulting in additional deposition and collection. The thus collected condensate will drip from the walls into the gutter, where it is further collected and drained together with the condensate of the film overflowing the top edge of the first section. In this way the removal efficiency is improved and the risk of undesired spitting is reduced.

In a preferred embodiment the inlet of the enclosure is delimited by the upper edge of a first section of the front guiding face and a lower edge of a second section of the front guiding face.

In an advantageous embodiment the lower edge of the second section is offset with respect to the upper edge of the first section thereby defining a gap upstanding from the front surface. The offset lower edge of the second section prevents that droplets from the liquid film on the first section are carried over the inlet of the condensate collector to the second section and ensures that the liquid film flows over the upper edge of the first section of the front guiding face into the inlet of the condensate collector. Preferably the upper edge of the first section and the lower edge of the second section of the guiding plate are spaced apart overlapping one another, thereby further reducing the risk of droplets from the film being carried over from the first section to the second section of the front guiding face of the guiding vane.

The enclosure of the condensate collector has a flow path for the flue gas from the inlet to the outlet, where droplets are removed from the flue gas. The flow direction of the partial stream of flue gas entering the condensate collector is deflected with respect to the main flow direction of flue gas along the front guiding face. This deflection occurs already at the inlet in the front guiding face and can be further supported by the design of the enclosure. An example of such a flow path supporting additional removal of droplets from the flue gas within the enclosure is a non-linear flow path. In such a non-linear flow path within the enclosure the inlet and outlet cannot be connected by a single straight line. Examples of such a non-linear flow path include a wavy or zigzag path. In an advantageous embodiment the non-linear flow path comprises at least one U turn, preferably two or more.

In a preferred embodiment the enclosure of the condensate collector comprises a droplet forming element, such as a plate, of which a lower part extends downwardly beyond the upper edge of the first section at a first distance from the back of the first section. An upper part may be connected directly to the back of the second section. This construction establishes a first U turn around the upper edge of the first section, ensuring that droplets in the flue gas hit the droplet forming element, deposit thereon and flow to the lower part thereof and drip into the below gutter.

In a further preferred embodiment thereof the gutter comprises a gutter plate, of which a lower part is attached to the back of the first section forming a groove for collecting condensate. An upper part thereof preferably extends upwardly beyond the lower end of the droplet forming element at a second distance from the back of the second section, wherein the second distance is greater than the first distance. In this way a second U turn of the flow path around the lower part of the droplet forming element is provided, as well as said groove between the back of the first section and the gutter plate. The condensate will be collected in this groove and drain therefrom. Moreover the spaced apart droplet forming element and gutter plate form the exit of the enclosure of the condensate collector, such that the partial stream of flue gas flowing through the enclosure leaves the outlet into the stack duct essentially in the same flow direction of the main flow of the flue gas. Thus any negative effect, such as turbulence, by the partial stream on the main flow is small.

In order to enhance drainage of the gutter a bottom section of the gutter plate slopes downwardly towards a lateral side of the gutter plate, preferably the bottom section slopes downwardly from the centre towards both lateral sides of the gutter plate.

In a further embodiment the guide vane according to the invention the back face comprises a back plate attached with its lower end to the lower end of the first section and with its upper end to the upper end of the second section, such that the guiding vane has a wing shape, and wherein the exit of the condensate collector extends through the back face. In this embodiment the wing shaped profile of the guiding vane increases the pressure difference between the inlet at the front guiding face of the guiding vane and the outlet in the back face, thus increasing the draft of the partial stream through the condensate collector and thereby also the removal efficiency.

In another embodiment such a back plate is attached with its lower end to the lower end of the front guiding face and its upper end extends spaced apart from the upper end of the front guiding face, wherein the spaced apart upper ends delimit the exit of the enclosure of the condensate collector. In this embodiment the partial stream exiting the outlet has a flow direction essentially parallel to the flow direction of the main stream of the flue gas, thereby reducing disturbing the main stream.

The front guiding face preferably has a curvature from its lower end in the direction of its upper end, typically a circular arc of 90°. The upper end preferably has a straight part, once installed extending parallel to the longitudinal direction of the duct. The straight section reduces turbulent flow of the flue gas in the duct towards the stack outlet. The inlet of the condensate collector is preferably positioned at or near the transfer of the curvature (first section) to the straight part (second section).

The back plate, if present, typically has straight ends, between which a curved section is present, typically also a circular arc of 90°, however with a smaller radius than the circular arc part of the guiding plate.

In a further embodiment the front guiding face, in particular its first section, is provided with an additional condensate collector at a position below the first condensate collector explained above. For example, the additional condensate collector may be configured as outlined above for the first condensate collector.

In a preferred embodiment the additional condensate collector comprises a recess in the front surface of the front guiding face and a T-shaped profile having its leg extending into the recess and ending at the distance therefrom. Advantageously the recess forming a gutter slopes from both lateral sides to the centre where a connection to a drain is provided. In a second aspect the invention relates to a wet stack, in particular for a power plant, such as a coal-fired power plant, for discharging a flue gas into the atmosphere, the stack comprising a shell defining an upright duct having an inlet and an outlet at its upper end, which stack is provided with one or more guide vanes according to the invention, in particular at a position within the duct opposite the inlet.

In an embodiment thereof, a plurality of guide vanes are arranged with their lower ends at an equally spaced distance from one another. Preferably the upper ends are arranged such that the flow through areas delimited by the guide vanes and the shell walls are equal. Both features contribute to a favourable diversion of the flow of flue gas into plural partial streams, deflection thereof and separation of droplets, and merger of the partial streams beyond the guide vanes.

Typically, the industrial wet stacks according to the invention are between 50 and 400 meters high, preferably from 100-175 metres high. Although the general shape of the cross section (flow through area) of the duct, such as square, rectangular, elliptical is not critical, typically the flow through area will be circular with diameters ranging from 3 meter to 15 metres.

The invention is illustrated hereinbelow by the attached drawing, wherein:

FIGS. 4 *a*) and *b*) show a third embodiment of a guide vane according to the invention.

Figure 1:
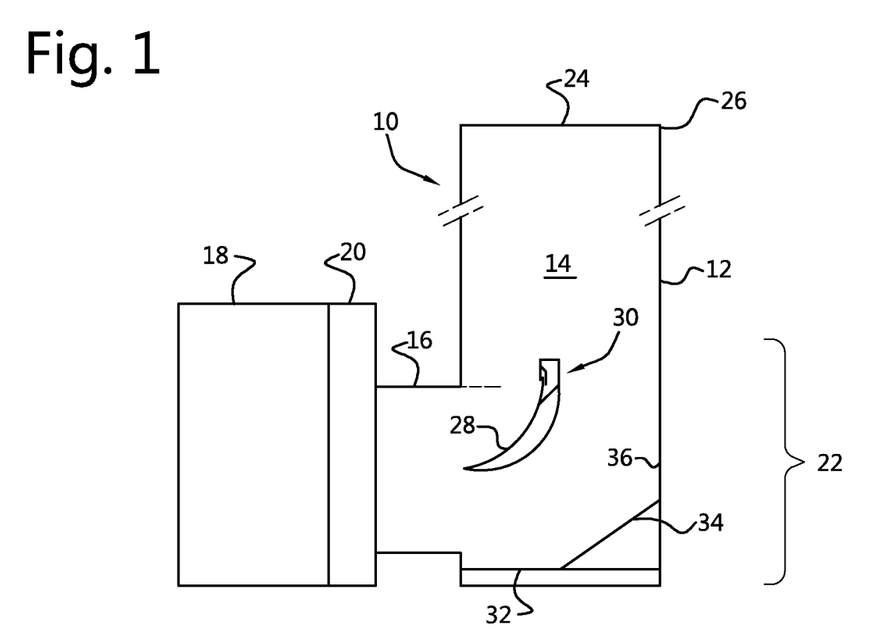
FIG. 1 shows an embodiment of a wet stack provided with a guide vane according to the invention.

In FIG. 1 an embodiment of a wet stack 10 is shown diagrammatically. The upright wet stack 10 comprises a shell 12, which may be provided with an inner lining (not shown). The shell 12 delimits an upstanding duct 14 for flue gas. An inlet 16 for introducing flue gas derived from an industrial plant 18, such as a (coal-fired) power plant provided with a wet desulphurisation system 20, is positioned at a lower part 22 of the duct 14. An outlet 24 at the upper end 26 of the duct 14 discharges flue gas into the atmosphere. at the inlet 16 a guide vane 28 is arranged, which has a condensate collector, which in its entirety indicated by reference numeral 30. The guide vane 28 diverts the flue gas entering through the inlet 16 and deflects it towards the outlet 24 through the duct 14. Typically a false floor 32 is positioned in the duct 14 below the inlet 16. A rear deflection plate 34 may be positioned at the inner wall 36 of the shell 12 opposite the inlet 16.

Various embodiments of a guide vane 28 are shown in more detail in FIG. 2-5.

Figure 2:
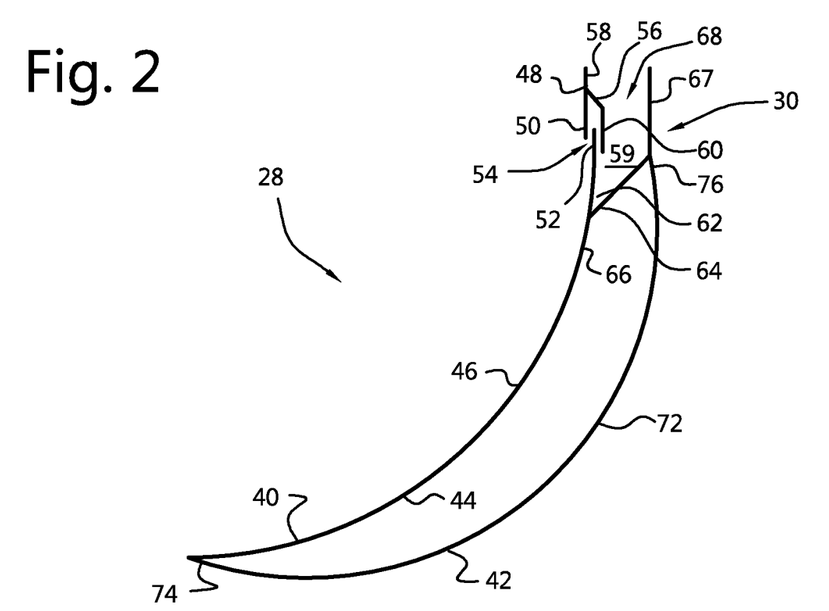
FIG. 2 is a first embodiment of a guide vane according to the invention.

FIG. 2 shows an embodiment of a guide vane 28 according to the invention in cross-section. The guide vane 28 has a front guiding face 40 and back face 42. The front guiding face 40 comprises a curved (concave) first section 46 and a (straight) second section 48, e.g. made from plate material of stainless steel. The lower end 50 of the second section 48 is offset and spaced apart from the upper end 52 of the first section 46, thereby establishing an inlet 54 of the condensate collector 30 for a partial stream of flue gas. The gap shaped inlet 54 extends over the full width of the duct 14 up to the inner wall 36 of the shell 12. As shown the upper end 52 of the first section 46 extends beyond the lower end 50 of the second section 48, thereby preventing carry-over of droplets of the condensate film from the first section 46 towards the second section 48 bypassing the inlet 54. A droplet forming element 56, in this embodiment a plate, is mounted to the back 58 of the second section 48 and extends with its free lower end 60 downwardly behind the upper end 52 of the first section 46 at a distance therefrom. Droplets contained in the partial stream will strike the droplet forming element 56, deposit thereon and flow towards the lower end 60 and drop into a gutter 62, The gutter 62 is constructed by gutter plate 64 mounted to the back 66 of the first section 46. In the embodiment shown the gutter plate 64 is shaped such its upper end 67 extends parallel to the second section 48 upwardly at a second distance therefrom. The gap between the back 58 of the second section and the upper end 66 of the gutter plate 64 is the outlet 68 of the condensate collector 30 for the partial stream of flue gas that during operation flows through the condensate collector 30. The upper end 52 of the first section 46, the lower end 50 of the second section 48, droplet forming element 56, gutter plate 64, together with the respective parts of the inner walls 36 of the shell 12 delimit an enclosure 59 of the condensate collector 30. The partial stream of flue gas flows from the inlet 54 through the enclosure 59 via a flow path comprising two U turns to the outlet 68, where the partial stream exits the condensate collector 30 in a direction parallel to the main stream of flue gas.

Figure 3:
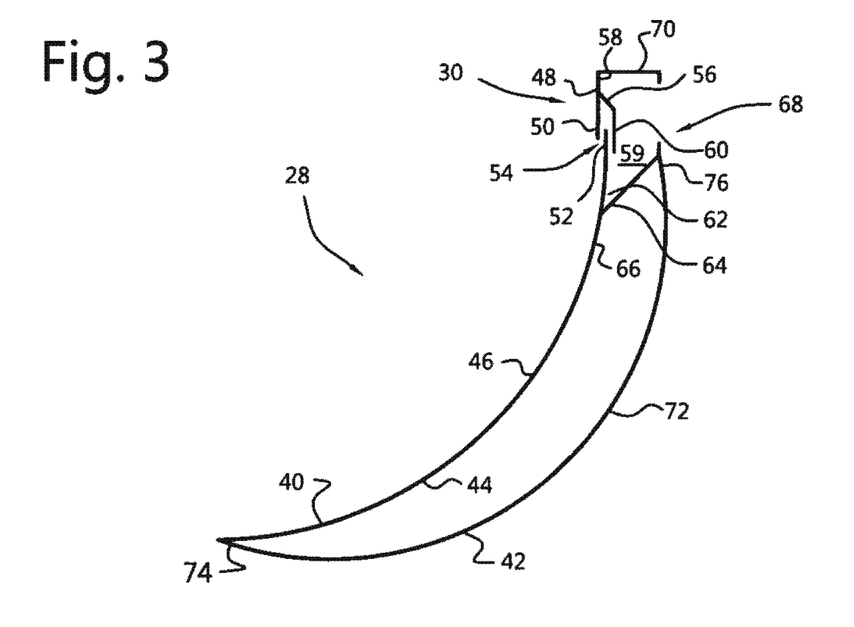
FIG. 3 represents a second embodiment of a guide vane according to the invention.

FIG. 3 shows another embodiment of a guide vane 28 having a similar configuration as the guide vane of FIG. 2. Components of this embodiment of the guide vane 28 similar to those of the embodiment of FIG. 2 are indicated by the same reference numerals. In the embodiment of Fig. the gutter plate 64 has no straight upstanding upper end. Instead thereof a cover plate 70 is mounted onto the second section 48. The gap between cover plate 70 and gutter plate 64 is the outlet 68 of the condensate collector 30 at the back face 42 of the guide vane 28.

Due to the pressure difference between the inlet at the front guiding face of the guide vane and the outlet at the top end of the guide vane or at its back face a part of the flue gas is drawn into the inlet of the condensate collector as a partial stream, in which condensate collector the condensate film flowing over the top end of the first section is collected, as well as further droplets that are deposited within the condensate collector.

This pressure difference can be increased by providing a back plate 72 as back face 42, which at its lower end 74 is attached to the lower end of the front guiding face 40 and its top end 76 to the gutter plate 64. The back plate 72 is curved such that the guide vane 28 has a wing shaped configuration causing an increase of the pressure difference (compared to a guide vane wherein the guiding front face and back face are provided by a single plate) as part of the flue gas flowing along the back plate 72 travels a longer distance than the flue gas flowing along the front guiding face 40.

Figure 4A:
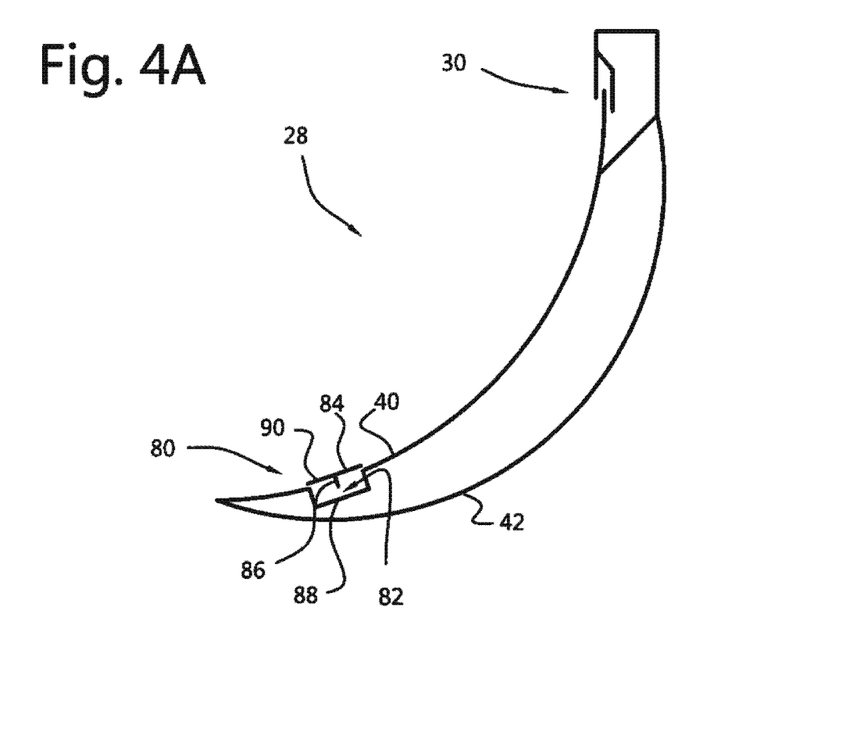
Figure 4B:
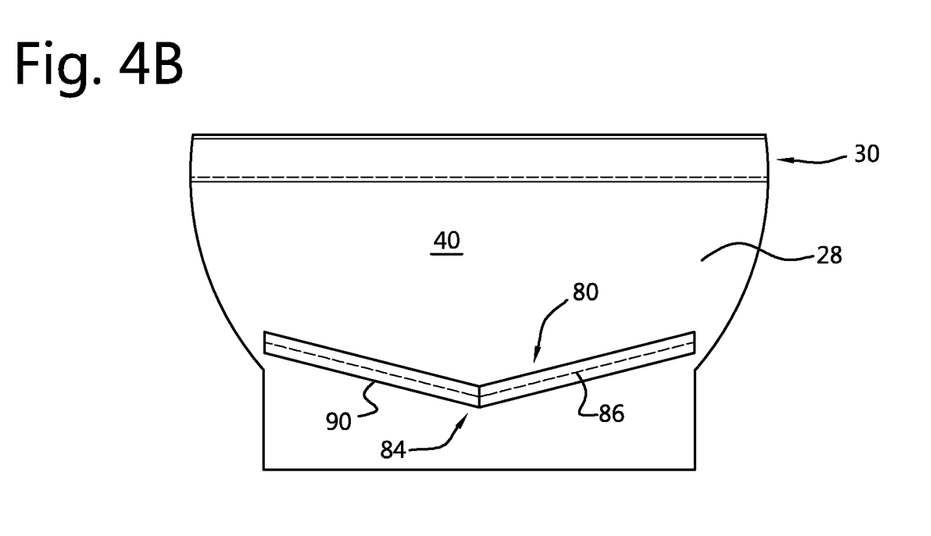

FIG. 4 shows yet another embodiment of a guide vane 28, which comprises an additional condensate collector 80 at a lower portion of the front guiding face 42. The top condensate collector 30 may be designed as shown in FIGS. 2 and 3. The additional condensate collector 80 is comprised of a recess 82 in the front guiding face 42 of the guide vane 28. A T profile element 84 is mounted partly into the recess 82 with its leg 86 at a distance of the recess bottom 88. The top legs 90 of the T profile element 84 extend over the front surface 42 adjacent the recess 82 thereby forming an inlet and outlet for a partial stream of flue gas flowing along the front surface. In the embodiment shown the recess 82 has a V shape—in front view—such that condensate collected in the recess 82 will flow towards the centre where a connection to a drain (both not shown) is provided.

The gutter 62 of the top condensate collector 30 can be designed in a similar way. Generally the angle between the legs of the V shape will be much larger. In an alternative way the gutter and/or recess have an inverted V shape such that condensate will flow from the centre to the lateral sides of the guide vane, where via a connection the condensate is discharged into a drain.

Figure 5:
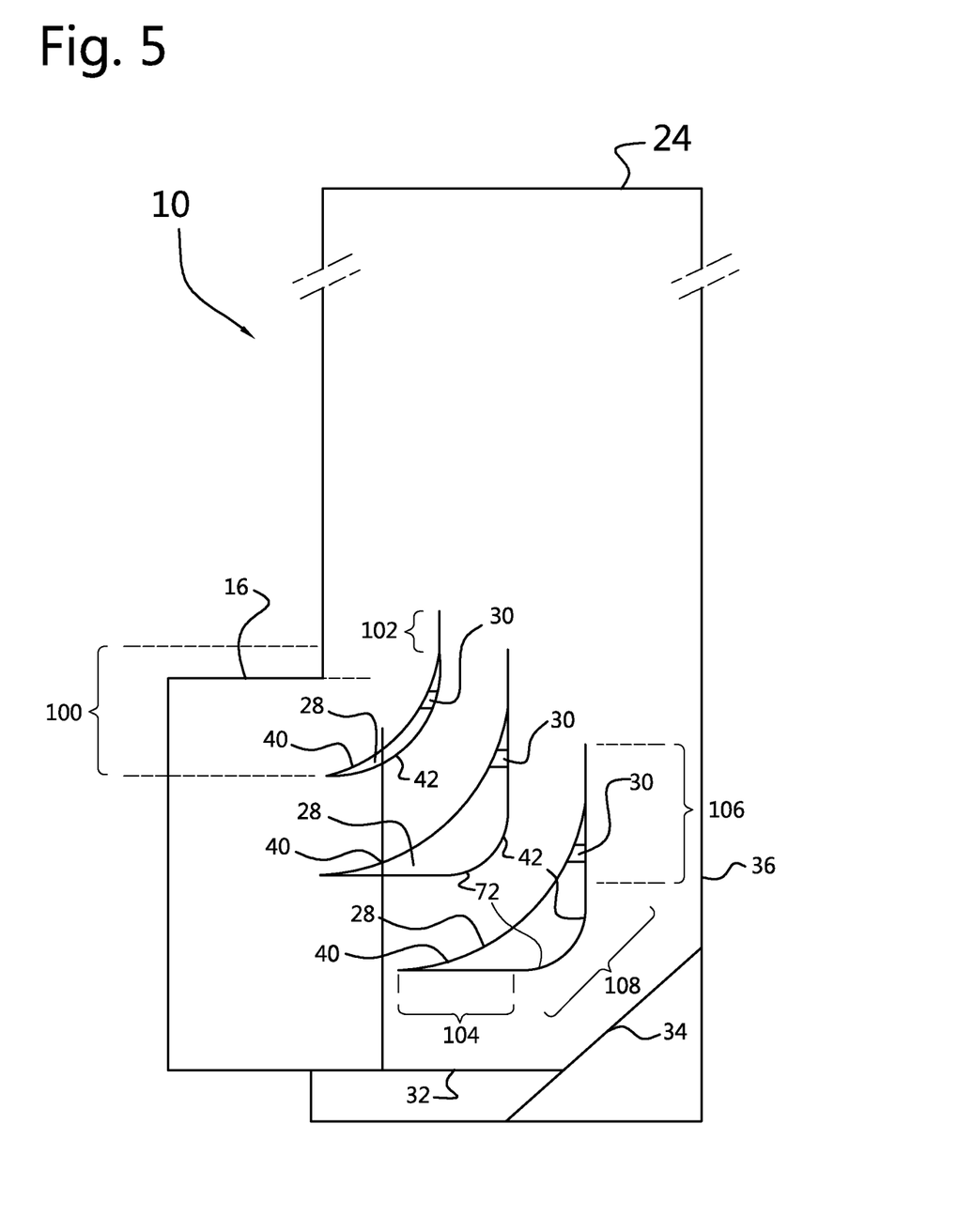
FIG. 5 is another embodiment of a wet stack provided with a plurality of guide vanes according to the invention.

FIG. 5 shows an embodiment of a wet stack provided with a plurality of guide vanes according to the invention. In the embodiment shown 3 guide vanes 28 are situated at the inlet 16. Each guide vane 28 is provided with a condensate collector 30, e.g. according to the configurations shown in the previous FIGS. 2-4, in particular according to FIG. 3. Each guide vane 28 has a curved front face 40, in particular a (first) section 100 having the shape of a circular arc and a straight top (second) section 102, parallel to the longitudinal axis of the duct 14. Each guide vane 28 also has a back plate 72 as back face 42, comprised of a first (lower) straight section 104 and second (upper) straight section 106 and an intermediate curved section 108, in particular a circular arc section having a smaller radius than that of the respective curved section of the front guiding face 40. The guide vanes 28 are positioned such that the upstream ends (at the inlet) are at an equal distance from one another and the downstream ends thereof together with the inner wall 36 where applicable, define almost equal flow through areas.

The invention claimed is:

1. A guide vane for deflecting flue gas in a wet stack, comprising a front guiding face and an opposite back face and a condensate collector for removing liquid droplets from the flue gas, wherein the condensate collector comprises:
   an enclosure having an inlet for entering flue gas in the front guiding face of the guiding vane, and an outlet for leaving flue gas,
   wherein the enclosure defines flow path for flue gas from the inlet to the outlet,
   wherein the inlet is delimited by an upper edge of a first section of the front guiding face and a lower edge of a second section of the front guiding face, and
   wherein the enclosure comprises a droplet forming member, which has a lower part extending downwardly beyond the upper edge of the first section at a first distance from the back of the first section; and
   a gutter for collecting liquid droplets separated from the flue gas arranged in the lowest part of the enclosure.

2. The guide vane according to claim 1, wherein the flow path for flue gas comprises a non-linear flow path.

3. The guide vane according to claim 1, wherein the lower edge of the second section is offset with respect to the upper edge of the first section thereby defining a gap upstanding from the front guiding face.

4. The guide vane according to claim 3, wherein the upper edge of the first section and the lower edge of the second section of the front guiding face are spaced apart overlapping one another.

5. The guide vane according to claim 1, wherein the gutter comprises a gutter plate, of which a lower part is attached to the back of the first section forming a groove.

6. The guide vane according to claim 5, wherein an upper part of the gutter plate extends upwardly beyond the lower end of the droplet forming element at a second distance from the back of the second section, wherein the second distance is greater than the first distance.

7. The guide vane according to claim 5, wherein a bottom section of the gutter plate slopes downwardly towards a lateral side of the guide vane.

8. The guide vane according to claim 7, wherein the bottom section slopes downwardly from the centre towards both lateral sides of the guide vane.

9. The guide vane according to claim 1, wherein the back face comprises a back plate that is attached with a lower end of the back plate to the lower end of the first section and with an upper end of the back plate to the upper end of the second section, such that the guiding vane has a wing shape, and wherein the outlet of the enclosure extends through the back face.

10. The guide vane according to claim 1, wherein the back face comprises a back plate that is attached with a lower end of the back plate to the lower end of the first section and an upper end of the back plate extending spaced apart from the upper end of the second section, wherein the spaced apart upper ends of the back plate and the second section delimit the outlet of the enclosure.

11. The guide vane according to claim 1, wherein the front guiding face has a curvature from the lower end of the front guiding face towards the upper end.

12. The guide vane according to claim 1, wherein the front guiding face is provided with an additional condensate collector at a position below the first condensate collector.

13. The guide vane according to claim 12, wherein the additional condensate collector comprises a recess in the front guiding face and a T-shaped profile having its leg extending into the recess and ending at a distance therefrom.

14. A wet stack for a power plant, for discharging a flue gas into the atmosphere, the stack comprising a shell defining an upright duct having an inlet and an outlet at its upper end, provided with one or more guide vanes according to claim 1.

15. A wet stack for a power plant, for discharging a flue gas into the atmosphere, the wet stack comprising a shell defining an upright duct having an inlet and an outlet at an upper end of the upright duct, provided with one or more guide vanes comprising a front guiding face and an opposite back face and a condensate collector for removing liquid droplets from the flue gas, wherein the condensate collector comprises:
   an enclosure having an inlet for entering flue gas in the front guiding face of the guiding vane, and an outlet for leaving flue gas,
   wherein the enclosure defines flow path for flue gas from the inlet to the outlet,
   wherein the inlet is delimited by an upper edge of a first section of the front guiding face and a lower edge of a second section of the front guiding face,
   wherein the lower edge of the second section is offset with respect to the upper edge of the first section thereby defining a gap upstanding from the front guiding face; and
   a gutter for collecting liquid droplets separated from the flue gas arranged in the lowest part of the enclosure.

16. The wet stack according to claim 15, wherein the upper edge of the first section and the lower edge of the second section of the front guiding face are spaced apart overlapping one another.

17. The wet stack according to claim 15, wherein the enclosure comprises a droplet forming member, which has a lower part extending downwardly beyond the upper edge of the first section at a first distance from the back of the first section.

18. The wet stack according to claim 15, wherein lower ends of the one or more guide vanes are arranged at an equally spaced distance from one another.

19. The wet stack according to claim 15, wherein upper ends of the one or more guide vanes are arranged such that the flow through areas delimited by the one or more guide vanes and shell inner walls are equal.

* * * * *